(12) United States Patent
Snyder

(10) Patent No.: US 7,127,630 B1
(45) Date of Patent: Oct. 24, 2006

(54) METHOD FOR ENTERING CIRCUIT TEST MODE

(75) Inventor: Warren Snyder, Snohomish, WA (US)

(73) Assignee: Cypress Semiconductor Corp., San Jose, CA (US)

(*) Notice: Subject to any disclaimer, the term of this patent is extended or adjusted under 35 U.S.C. 154(b) by 809 days.

(21) Appl. No.: 09/972,133

(22) Filed: Oct. 5, 2001

Related U.S. Application Data

(60) Provisional application No. 60/243,708, filed on Oct. 26, 2000.

(51) Int. Cl.
*G06F 11/273* (2006.01)
*G06F 11/27* (2006.01)
*G06F 11/22* (2006.01)

(52) U.S. Cl. .................... 713/502; 713/310; 714/36; 714/724

(58) Field of Classification Search ................ 365/201; 714/36, 724
See application file for complete search history.

(56) References Cited

U.S. PATENT DOCUMENTS

| | | | |
|---|---|---|---|
| 5,202,687 A | | 4/1993 | Distinti |
| 5,230,000 A | * | 7/1993 | Mozingo et al. ............ 714/732 |
| 5,479,652 A | | 12/1995 | Dreyer et al. .......... 395/183.06 |
| 5,664,199 A | | 9/1997 | Kuwahara ................... 395/734 |
| 5,802,073 A | * | 9/1998 | Platt ........................... 714/733 |
| 6,005,814 A | * | 12/1999 | Mulholland et al. ........ 365/201 |
| 6,144,327 A | | 11/2000 | Distinti et al. |
| 6,460,172 B1 | | 10/2002 | Insenser Farre et al. |

OTHER PUBLICATIONS

CYPR-CD00176; "Test Architecture for Microcontroller Providing for a Serial Communication Interface"; Oct. 5, 2001; U.S. Appl. No. 09/972,003; W. Synder.
CYPR-CD00179; "Method for Applying Instructions to Microprocessor in Test Mode"; Oct. 5, 2001; U.S. Appl. No. 09/972,319; W. Snyder.

\* cited by examiner

*Primary Examiner*—Gilberto Barrón, Jr.
*Assistant Examiner*—Venkat Perungavoor

(57) ABSTRACT

A method for entering test mode of an integrated circuit device is disclosed. In one embodiment of the present invention, after a lockout period, a test controller generates a signal indicating the integrated circuit is willing to enter the test mode. After the signal, the test controller monitors a test interface during a predetermined period of time for a digital password. Then, in response to a valid password being received within the predetermined period, the test controller enters the test mode. In another embodiment, in addition to the above steps, in response to the valid password being received, the test controller generates an acknowledge signal. In one embodiment, the predetermined period of time takes place during a holdoff period after the lockout period. In another embodiment, the test interface is serial.

22 Claims, 7 Drawing Sheets

METHOD FOR ENTERING CIRCUIT TEST MODE

RELATED U.S. APPLICATION

This Application claims priority to the copending provisional patent application Ser. No. 60/243,708, entitled "ADVANCED PROGRAMMABLE MICROCONTROLLER DEVICE", with filing date Oct. 26, 2000, and assigned to the assignee of the present application.

FIELD OF THE INVENTION

The present invention relates to the field of testing electronic circuitry. Specifically, the present invention relates to a method which provides entry into test mode without impacting chip performance.

BACKGROUND ART

Testing a relatively complex circuit presents a number of challenges and trade-offs with respect to the use of the circuit's external pins. As pins are a relatively expensive component of modern circuits, it is desirable to keep the pin count low. Some conventional architectures dedicate selected pins to testing the circuit. While this simplifies the design, the pin count and hence the cost must be raised, if functionality is not to be sacrificed. Alternatively, the pin count can be kept constant, but at the expense of sacrificing circuit functionality due to selected pins being used for testing rather than another function. The fewer pins that the circuit has, the greater the problem of dedicating pins to testing becomes.

Testing circuits presents other problems as well, such as inadvertently entering test mode while the circuit is in its normal mode. Some conventional architectures used to test circuits allow the user to impose a supervoltage on one of the pins to trigger entry into the test mode. While this method may allow a pin to be used for more than just testing, this method is susceptible to noise accidentally causing entry to the test mode. For example, a user may generate electrostatic discharge while using a computer mouse device. The discharge may be transferred to the circuit, thus triggering entry into test mode. The result may be a program error requiring the user to reboot the computer.

Furthermore, the circuitry needed to support the above supervoltage technique may be complex. Thus, the cost of the circuit may be increased. Furthermore, the supervoltage circuitry may negatively impact issues such as circuit real estate and the designing of the circuit itself.

Still other problems are faced by the external testing device, which may have difficulty sending the analog waveform required by some circuits to put them into test mode.

Therefore, it would be advantageous to provide a method which allows getting into and out of test mode without disturbing normal operations. It would be further advantageous to provide a method of entering test mode of a circuit with a limited pin count. It would be further advantageous to provide such a method which does not require complex circuitry to enter circuit test mode. Finally, it would be advantageous to provide such a method for testing a circuit which minimizes the chance of accidentally entering test mode.

SUMMARY OF THE INVENTION

The present invention provides for a method for entering test mode without adding to the pin count. Furthermore, embodiments provide for a method for entering test mode while minimizing the chance of accidentally entering test mode. Furthermore, embodiments provide for such a method which does not require complex circuitry to enter circuit test mode. The present invention provides these advantages and others not specifically mentioned above but described in the sections to follow.

A method for entering test mode of an integrated circuit device is disclosed. In one embodiment of the present invention, after a lockout period in which the voltages of the circuit ramp up, a test controller generates a signal indicating the integrated circuit is willing to enter the test mode. After the signal, the test controller monitors a test interface during a predetermined period of time for a digital password. Then, in response to a valid password being received within the predetermined period, the test controller enters the test mode.

In another embodiment, in addition to the above steps, in response to the valid password being received, the test controller generates an acknowledge signal.

In one embodiment, the negotiation to enter test mode takes place during a holdoff period after the lockout period. As the circuit is not useable for normal operation during the holdoff period, circuit performance is not impaired. In one embodiment, the test interface is serial. In yet another embodiment, the password, is received by the test controller via one pin of the test interface while a clock signal is being received by the test controller via another pin of the test interface and the test interface is serial.

In one embodiment, if the password is not detected during the predetermined period of time the integrated circuit does not enter the test mode and a reset exit occurs, wherein normal circuit operation is entered.

DETAILED DESCRIPTION OF THE INVENTION

In the following detailed description of the present invention, a method of entering circuit test mode, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Exemplary Test Architecture

Embodiments of the present invention comprise a test architecture which includes an interface to a test controller located on the same bus as a microprocessor and various registers, memories, etc. under test. The test controller becomes the master during test mode and receives commands and data via the interface and sends data out the interface. The architecture features an instruction queue, which the test controller feeds instructions. Thus, embodiments of the present invention accomplish the functionality of scan logic without the overhead.

Figure 1:
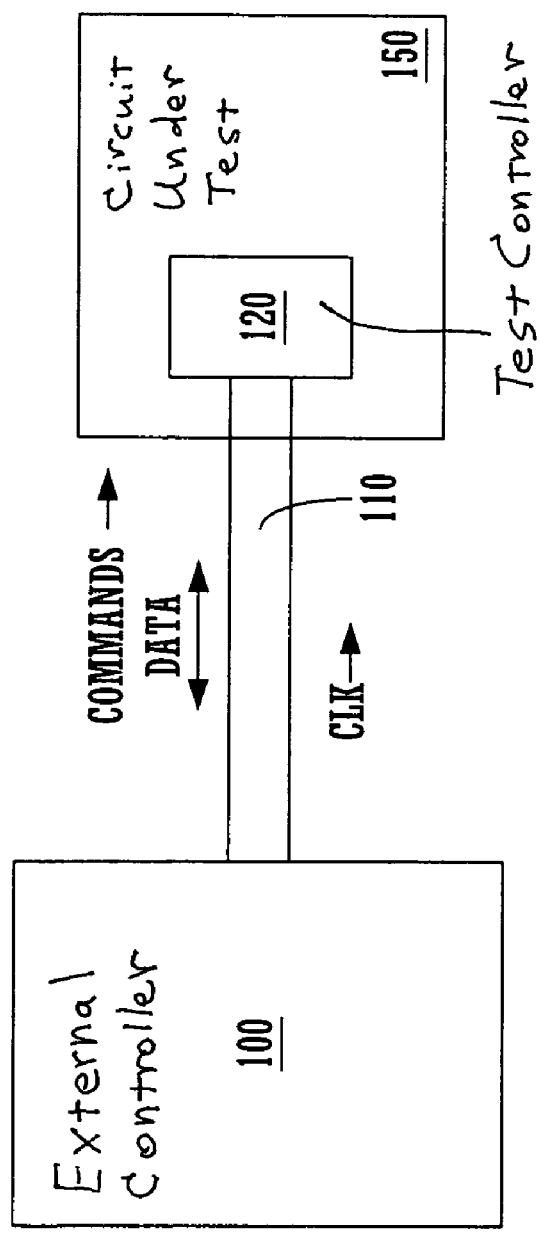
FIG. 1 is a diagram of a system for testing a circuit, according to embodiments of the present invention.

FIG. 1 illustrates a system in which the present invention may be practiced. The present invention allows an external controller 100 that is external to the circuit under test 150 to issue test commands, data, and addresses over the test interface 110. The data may be exchanged serially in packet data format. The external controller 100 may be a personal computer or a conventional production tester or the like.

The test controller 120 on the circuit 150 decodes the commands into sequences that exercise the circuit 150. In one embodiment, the commands are in the form of register or memory reads or writes. Thus, the circuit 150 resources appear as some form of R/W memory. The present invention allows the circuit 150 to be tested with the microprocessor running at 100 percent clock speed. Furthermore, structural testing can be performed over the test interface 110. A still further benefit of the present invention is that all input/output pins may be structurally tested without probing them. However, Current output high/low and Voltage output high/low type measurements may require probing.

The test interface 110 (e.g., the integrated circuit pins) is not dedicated to testing the circuit 150 and hence is used for another function when not in test mode. For example, it may be used to output the signal from a crystal oscillator within the circuit 150. The commands and data are received serially, in the preferred embodiment. Test interface 110 may be a two pin interface, in this embodiment. One pin may be a bidirectional data pin. The other pin may be used for a clock, which may be user supplied to clock in the data, in one embodiment. However, the present invention is well suited to a test interface 110 with any number of pins. Furthermore, the circuit 150 under test may have any number of pins. When the circuit 150 has relatively few pins (e.g., four) it may become more important to be able to use the test pins for dual purposes. However, even if many pins are available, the present invention may still provide more efficient use of resources and allow a circuit 150 to have more functionality by re-using pins.

Figure 2:
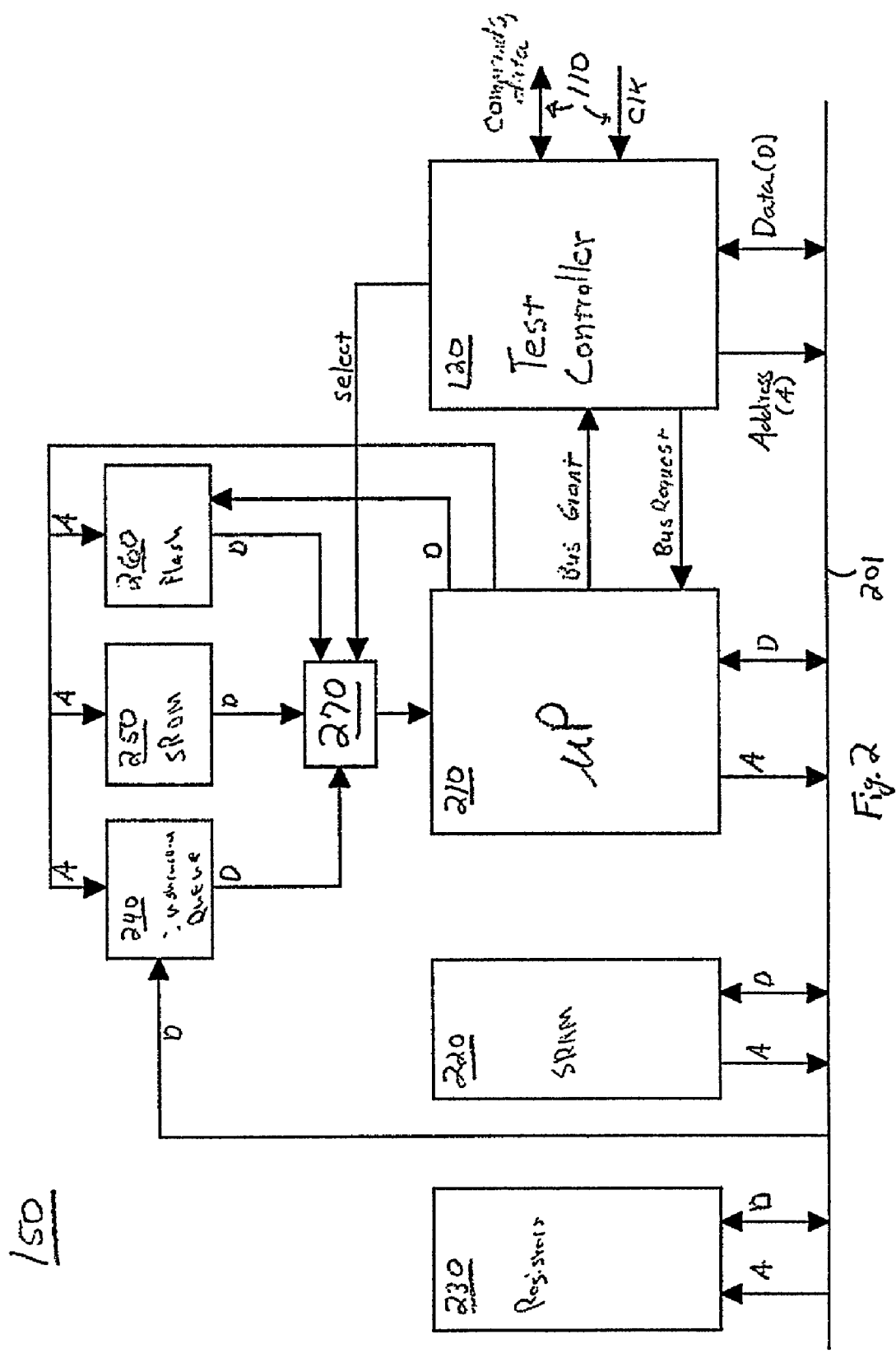
FIG. 2 is a diagram of an architecture for providing an interface to test a circuit, according to embodiments of the present invention.

FIG. 2 shows a diagram of circuit 150 in accordance with one embodiment of the present invention. As depicted in FIG. 2, the on-chip test controller 120 is coupled to the test interface 110. The circuit 150 also comprises a microprocessor 210, which executes instructions fed in from the multiplexer 270. When the test controller 120 desires control of the bus 201 it sends a bus master request to the microprocessor 210, which returns a bus master grant, as is well understood in the art.

The test controller 120 controls the multiplexer 270. However, it is also possible to allow the microprocessor 210 to have control over the multiplexer 270, as well. In this embodiment, the microprocessor 210 reacts to the instruction it is executing by sending a signal to the multiplexer 270, which causes the multiplexer 270 to feed the microprocessor 210 commands from a different source.

The test controller 120 receives commands from the external interface 110 and transfers them via the system bus 201 to the instruction queue 240. The Supervisory Read Only Memory (SROM) 250 contains instructions which are to be run in the microprocessor 210 while under test mode. Thus, the present invention is able force the microprocessor 210 to execute a set of pre-determined instructions. When such instructions are executed the circuit 150 may be in what is referred to in this application as a supervisory state, which is part of the test mode. In a preferred embodiment, during test mode only instructions from the instruction queue 240 and the SROM 250 are executed. In this fashion, the program flash 260 is bypassed.

In one embodiment, a command may be placed in the instruction queue 240 by the test controller 120, which may cause the microprocessor 210 to go into a supervisory state. In this state, the microprocessor 210 may take control of the multiplexer 270. In this fashion, commands from the supervisory ROM 250 are run in the microprocessor 210. The microprocessor 210 may also cause selected logic (e.g., registers 230), which was not accessible, to become accessible. After the commands have finished, the microprocessor returns control of the multiplexer to the test controller and once again commands are executed from the instruction queue 240.

Thus, embodiments may execute a series of instructions by the test controller 120 filling the instruction queue 240 with the instructions. When executing commands from the supervisory ROM the circuit 150 may be tested at normal clock speed. Embodiments allow running complex testing algorithms at high speed by switching between instructions that the test controller 120 put in the instruction queue 240 and pre-determined sets of instructions in the supervisory ROM 250. Thus, an instruction in the instruction queue 240 may function as a subroutine call and the supervisory ROM 250 may store a number of subroutines.

The program flash 260 may contain instructions that may be executed in the microprocessor 210 during normal mode (e.g., not test mode). Embodiments bypass the program flash 260 when in test mode.

The test controller 120 may transfer data between itself and the peripheral registers 230 and the Static RAM (SRAM) 220 via the bus. Thus, the contents of the peripheral registers 230 and SRAM 220 may be read and written from the external controller 100, as explained in the description of FIG. 1.

The test controller 120 is able to transfer commands to the instruction queue 240 via the bus 201. As explained herein, the test controller 120 may receive commands via the test interface 110 from the external controller 100 and translate these commands, if necessary.

In the present embodiment, the program flash 260 may only receive data from the microprocessor 210. The instruction queue 240, Supervisory ROM (SROM) 250, and the Program Flash 260 are addressed by the microprocessor 210.

It will be understood that the various registers and memories may be implemented with other hardware. For example, the SROM 250 may be implemented with RAM or otherwise. The same applies to the program flash 260 and other elements.

The peripheral registers 230 may be, in general, those components which constitute parts of a microcontroller. For example, these registers may comprise programmable analog and digital on-chip systems, input/output pins, and various fixed function blocks.

Thus, embodiments of the present invention provide for an efficient mechanism for feeding instructions to the microprocessor 210, single stepping instructions, programming the programmable analog and digital on-chip systems, routing the programmable digital and analog on-chip systems, routing input and output signals to I/O pins, and executing programs without requiring flash memory 260.

Figure 3:
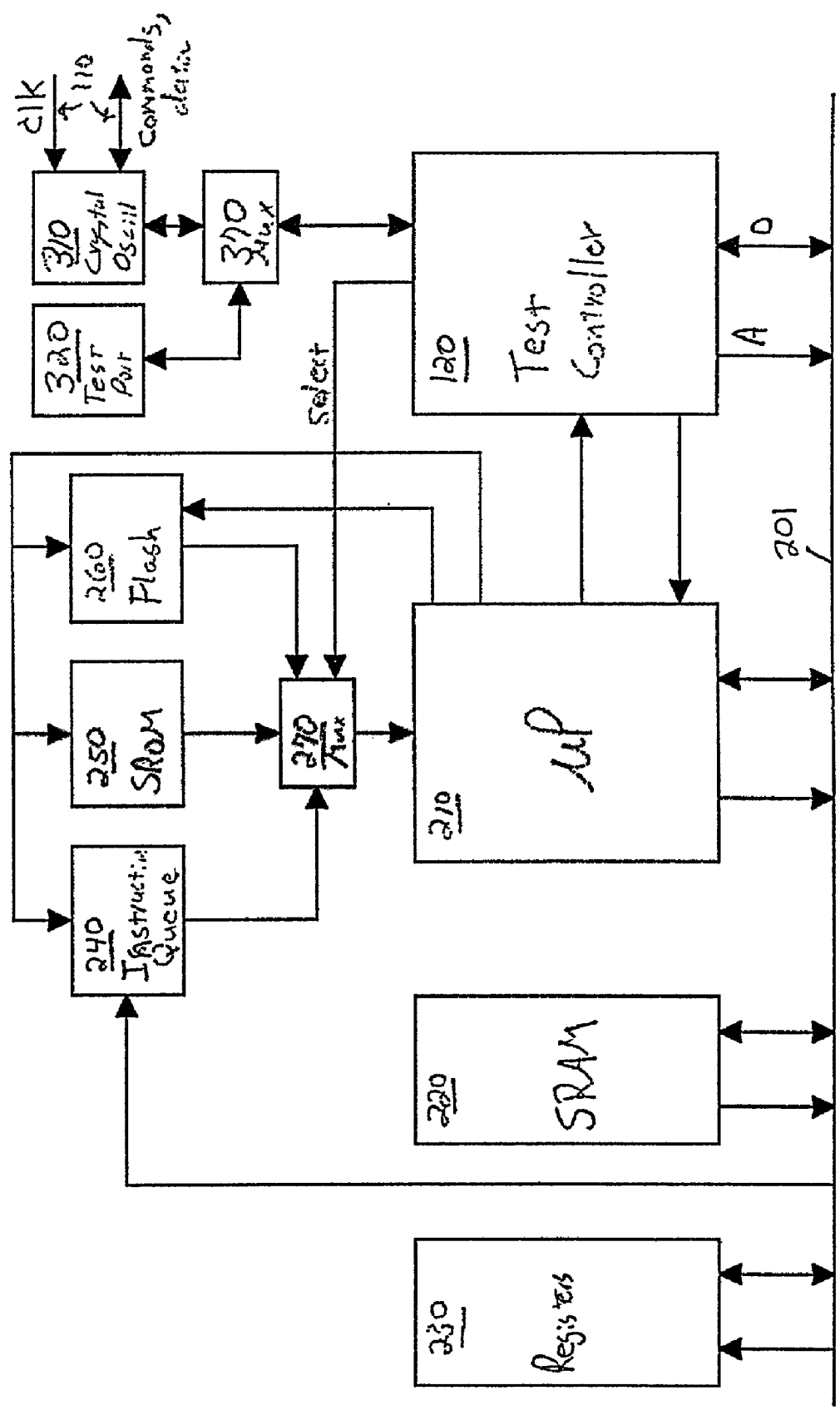
FIG. 3 is a diagram of an architecture for providing an interface to test a circuit, according to embodiments of the present invention.

FIG. 3 illustrates an embodiment of the present invention in which the test interface 110 is shared with a crystal oscillator 310. FIG. 3 also shows an additional test port 320 which may be used instead of the test controller 120. A multiplexer 370 is used to select whether the test controller 120 or additional test port 320 has access to the test interface 110.

Applying Instructions to a Microprocessor While in Test Mode

Embodiments allow instructions to be fed to a microprocessor 210 from both an external source and from an on-chip source. For example, arbitrary instructions may be entered via the test interface 110. Furthermore, the supervisory ROM 250 may store pre-determined sub-routines. Various embodiments may single step through a series of instructions loaded into the instruction queue 240, may execute instructions from the Supervisory ROM 250, and may alternate between the two sources, allowing for great flexibility.

Figure 4:
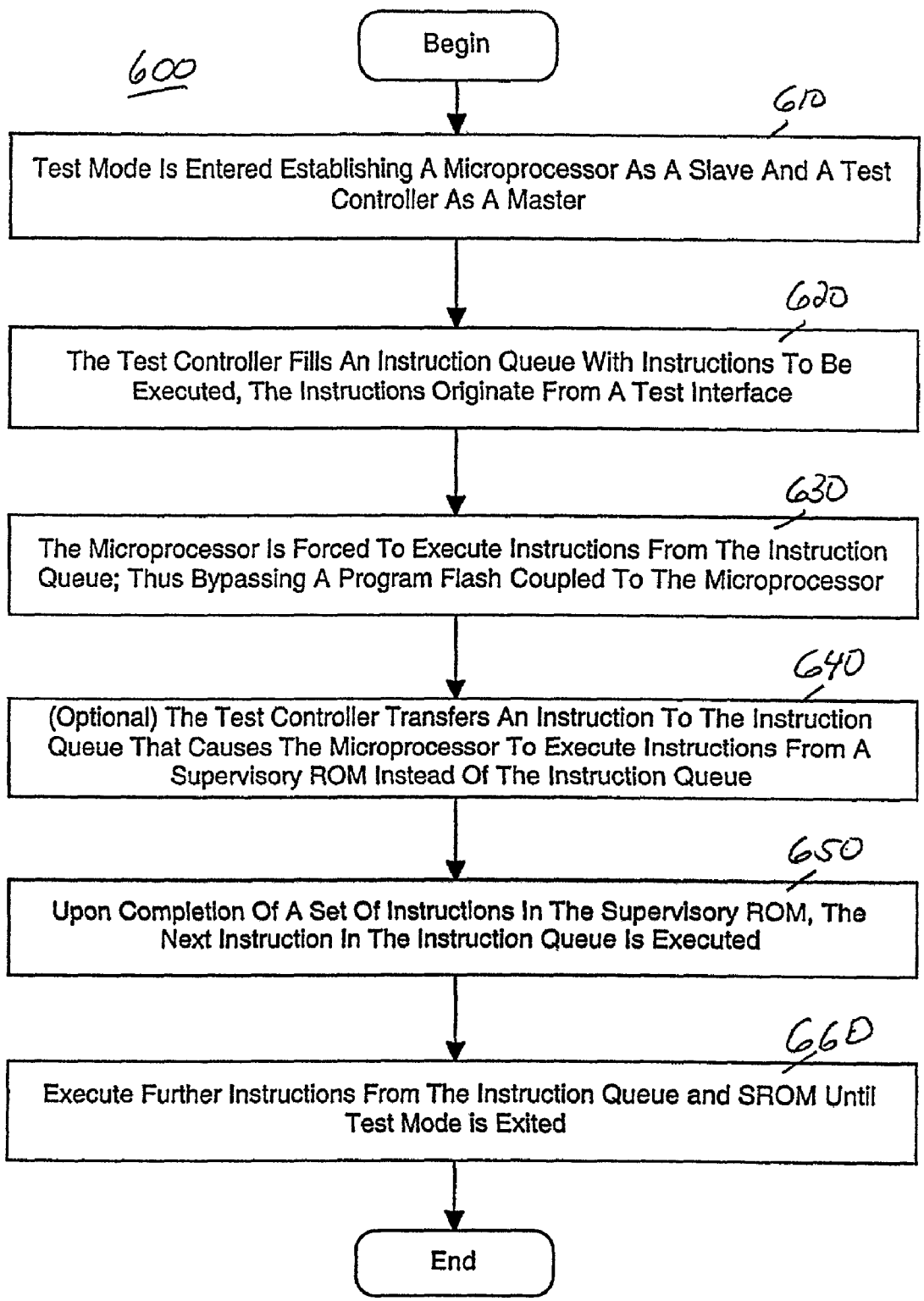
FIG. 4 is a flowchart of steps of a process of applying instructions to a microprocessor during test mode, according to an embodiment of the present invention.

FIG. 4 illustrates an embodiment of a process 600 in which multiple instructions are single stepped through the instruction queue 240, along with the option of running routines from the SROM 250. In step 610, a test mode is entered establishing the microprocessor 210 as a slave and the test controller 120 as a master. Embodiments described herein provide further details of test mode entry methodology.

In step 620, the test controller 120 fills the instruction queue 240 with instructions to be executed in the microprocessor 210. These instructions may originate from the test interface 110. By originating from the test interface 110 it may be meant that the instruction that the test controller 120 transfers to the instruction queue 240 is based on a command or instruction received over the test interface 110. However, the test controller 120 may provide some translation or modification of the received instruction. Thus, it is not required that there be a one-to-one correspondence between the instruction received over the test interface 110 and the one sent to the instruction queue 240.

In step 630, the microprocessor 210 is forced to execute instructions from the instruction queue 240. In this fashion, the program flash 260 is bypassed when the circuit 150 is in test mode. If desired, a string of instructions may be single stepped in this fashion.

In optional step 640, the test controller 120 transfers an instruction to the instruction queue 240 that, when received by the microprocessor 210, cause the microprocessor 210 to execute instructions from the supervisory ROM 250 instead. This may be referred to as a supervisory or privileged state, in which greater access to various registers is provided for more complete testing.

In step 650, after a set of instructions from the supervisory ROM 250 completes, the next instruction in the instruction queue 240 is executed. The process 600 may continue by executing more instructions from both the instruction queue 240 and the SROM 250, until the test mode is left, in step 660.

Figure 5:
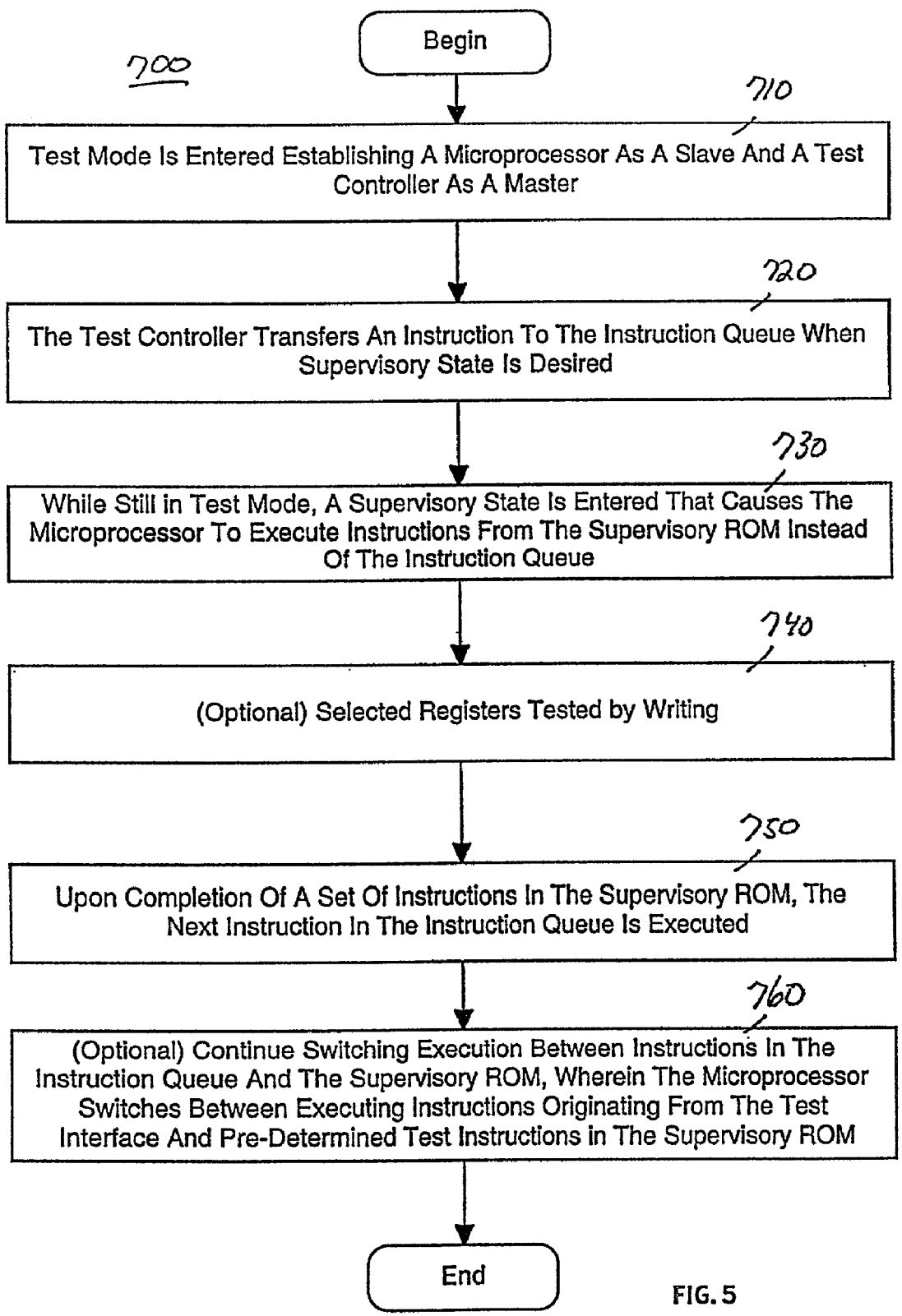
FIG. 5 is a flowchart of steps of a process of applying instructions to a microprocessor during test mode and switching between on-chip and off-chip instructions, according to an embodiment of the present invention.

FIG. 5 shows an embodiment of a process 700 in which a single instruction sent to the instruction queue 240 may cause, in effect, a sub-routine call to execute a set of instructions in the supervisory ROM 250. After establishing the test mode in step 710, the test controller 120 transfers an instruction the instruction queue 240, in step 720.

In step 730, while still in test mode, a supervisory state is entered, in which the microprocessor 210 executes instructions from the supervisory ROM 250 instead of the instruction queue 240. In this state, the microprocessor may take control of the multiplexer 270 and cause instructions from the SROM 250 to be fed into it, although this is not required. While in supervisory state it may be possible to test the circuit 150 at normal speed (e.g., at 100 percent clock speed).

In optional step 740, various registers are tested by writing to a register during the supervisory state. The given register is one that is not writeable during the test mode when not in supervisory state. Thus, it may be possible to test elements during test mode when in supervisory state that may not be fully testable during test mode when not in supervisory state.

In step 750, the supervisory state is left, and instructions are once again executed from the instruction queue 240. In one embodiment, the microprocessor 210, which had taken control of the multiplexer 270 during the supervisory state, allows the test controller 120 to once again control the multiplexer 270.

In optional step 760, the process continues to switch between executing instructions from the instruction queue 240 and the supervisory ROM 250, all while in test mode. In this fashion, the microprocessor 210 switches between executing instructions originating from the test interface 110 and pre-determined instructions from the SROM 250. The process 700 may then end and test mode exited.

It is appreciated that various steps in the embodiments illustrated in process 600 and process 700 of FIGS. 4 and 5 may be optional and that steps from one process may be used in the other.

Test Mode Entry Methodology

The following describes embodiments which provide for a method to enter test mode of circuit 150. When voltage is applied to the circuit 150 as part of its normal power on, a special negotiation takes place over the test interface 110 during a window of time after power on. Furthermore, a password may be required. Beneficially, the negotiation does not interfere with chip performance.

Figure 6:
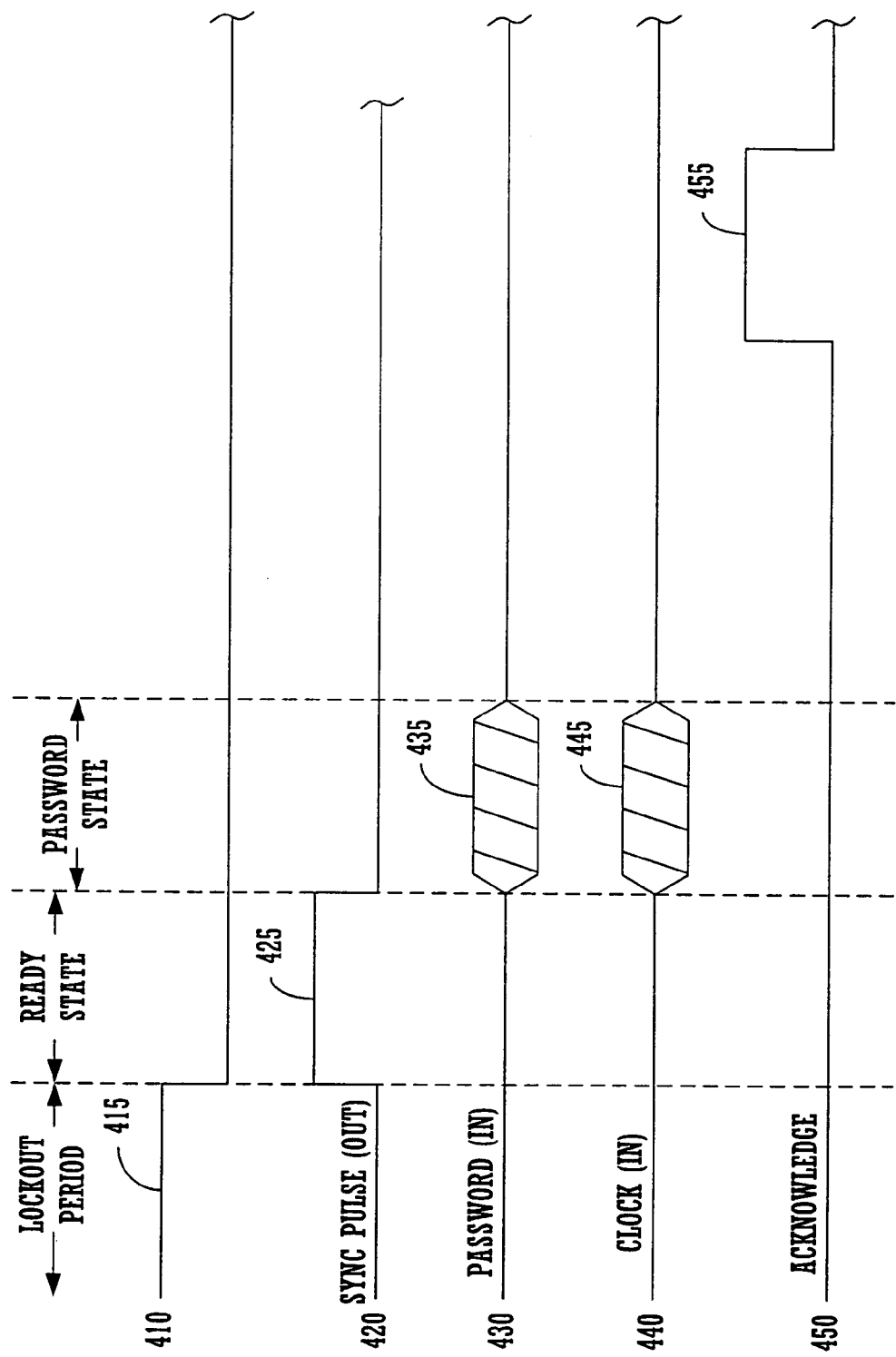
FIG. 6 is a diagram of traces indicating the sequence of events that occur during entering chip test mode, according to embodiments of the present invention.

FIG. 6 represents traces indicating the sequence of events during negotiation of entry into test mode. It will be understood that while some of the traces reflect a signal on a pin of the circuit 150, not all traces are for unique pins. For example, traces 420 and 430 may occur on the same pin. FIG. 6 will be described in conjunction with the process 500 of FIG. 7.

Figure 7:
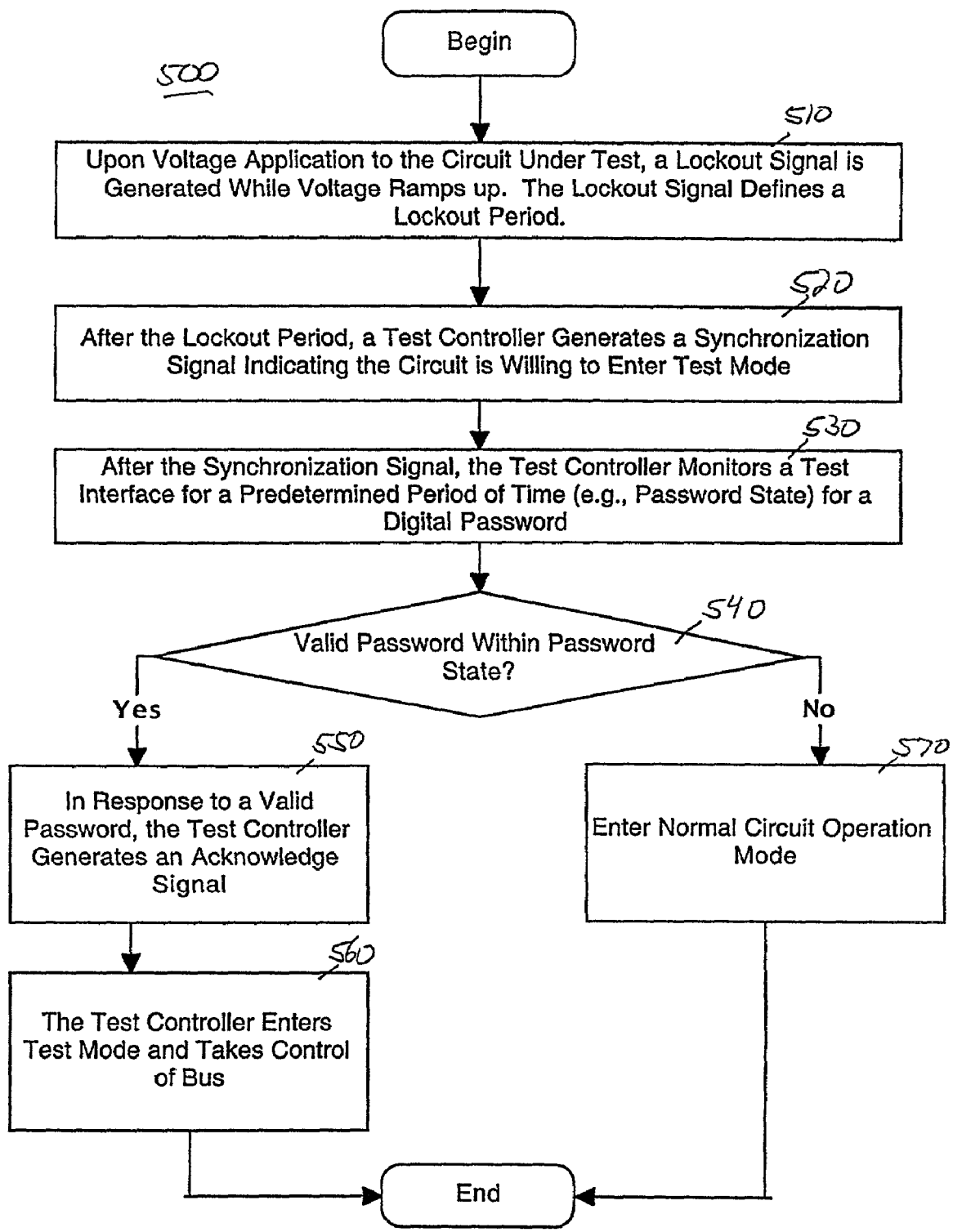
FIG. 7 is a flowchart illustrating the steps of a process of entering circuit test mode, according to an embodiment of the present invention.

Referring now to FIG. 6 and to step 510 of FIG. 7, when the circuit 150 is powered on, the circuit 150 generates a lockout signal 415. This represents the period for which voltage levels are ramping up. At the end of the lockout period, a power on reset release occurs. This indicates that voltage levels are sufficient for logic operations within the circuit 150.

Referring to trace 420 of FIG. 6 and step 520 of FIG. 7, after the lockout period, the test controller 120 generates a synchronization pulse 425. This synchronization pulse 425 indicates that the circuit 150 is ready to negotiate entry into test mode (e.g., a ready state is entered.) The synchronization pulse 425 may appear on a single data pin of the circuit under test 150. For example, this may be a data in/out pin of the test interface 110. The length of the synchronization pulse 425 is not critical, although it may be convenient to use one half of the circuit's hold off period. This may be 8 ms, however, other periods are also suitable. Circuit 150 may use a timing reference, such as, for example, a precision oscillator (not shown) during steps of process 500. While the synchronization pulse 425 is shown as occupying the entire ready state, this is not required.

Referring to trace 430 of FIG. 6 and step 530 of FIG. 7, after the synchronization pulse 425, the test controller 120 monitors the test interface 110 for a digital password 435 (e.g., a password state is entered.) During this password state, a device such as, for example, external controller 100 sends a password 435 over the test interface 110. This may be sent over the same data in/out pin as the synchronization pulse 425 was sent, although this is not required. While the digital password 435 is shown as occupying the entire password state, this is not required.

The password 435 is a bit sequence, which preferably comprises enough bits to substantially eliminate the chance of noise causing an erroneous entry into test mode. Therefore, embodiments may use any number of bits for the digital password 435.

Still referring to FIG. 6, trace 440 represents a clock signal 445, which may be supplied by the external test controller 100 while it is sending the password 435. The clock signal 445 may be transmitted over the other pin of two-pin test interface 110 (E.g., clock on one pin, password on the other).

In one embodiment, the ready state and the password state take place during a circuit holdoff period, which may be, for example 16 ms –100 ms. However, the present invention is not limited to these times periods or to using the entire holdoff period or even to limiting the ready state and the password state to the chip's holdoff period. However, making use of the holdoff period, along with the lockout period 415 allows test entry negotiation to take place while the circuit 150 is otherwise under reset. Therefore, the system is not negatively impacted.

Referring now to trace 450 of FIG. 6 and step 540 of FIG. 7, if a valid password 435 is received within the password state, the test controller 120 sends an acknowledge signal 455 over the test interface 110.

Then, the test controller 120 enters test mode, in step 550. In test mode the test controller 120 takes control of the bus 201, while the microprocessor 210 becomes the slave.

On the other hand, if a password 445 is not detected during the password state, the circuit 150 will not enter test mode. Instead a reset exit (not shown) occurs and the circuit 150 enters normal mode of operation, in step 560.

The preferred embodiment of the present invention, a method for entering circuit test mode, is thus described. While the present invention has been described in particular embodiments, it should be appreciated that the present invention should not be construed as limited by such embodiments, but rather construed according to the below claims.

I claim:

1. A method for entering test mode of an integrated circuit under test, said method comprising:
    generating a power-on reset release signal;
    generating a synchronization pulse indicating said integrated circuit is willing to enter said test mode, said synchronization pulse output from said integrated circuit under test to an external controller coupled to said integrated circuit under test by a test interface;
    after said synchronization pulse, monitoring a test interface for a digital password, wherein said generating a synchronization pulse and said monitoring a test interface occur within an interval of time that begins with said power-on reset release signal and has a predetermined length; and
    entering said test mode in response to a valid password being received within said predetermined interval of time.

2. The method of claim 1, further comprising:
    in response to said valid password being received, generating an acknowledge signal.

3. The method of claim 1 further comprising:
    receiving commands via digital packets over said test interface.

4. The method of claim 1 further comprising:
    a test controller coupled to a bus in said integrated circuit taking control of said bus in said test mode, wherein a microprocessor coupled to said bus becomes a slave.

5. The method of claim 1 wherein said generating a synchronization pulse and said monitoring a test interface occur during a holdoff period during which said integrated circuit is otherwise under reset.

6. The method of claim 1 wherein said password is received on one pin of said test interface while a clock signal is being received on another pin of said test interface.

7. The method of claim 1 wherein if said valid password is not detected during said predetermined interval of time said integrated circuit does not enter said test mode, wherein normal circuit operation is entered.

8. A method for entering test mode of an integrated circuit under test, said method comprising:
    after a lockout period, generating a synchronization pulse indicating said integrated circuit under test is willing to enter said test mode, said synchronization pulse output from said integrated circuit under test to an external controller coupled to said integrated circuit under test by a test interface;
    after said synchronization pulse, a test controller of said integrated circuit monitoring said test interface during a predetermined period of time for a digital password; and
    said test controller entering said test mode in response to a valid password being received within said predetermined period of time.

9. The method of claim 8 further comprising:
    upon voltage application to said integrated circuit, generating a lockout signal while voltage ramps up, said lockout signal defining said lockout period.

10. The method of claim 8, further comprising:
    in response to said valid password being received, said test controller generating an acknowledge signal.

11. The method of claim 8 further comprising:
said test controller receiving commands via digital packets over said test interface, said test interface being a serial interface.

12. The method of claim 8 further comprising:
said test controller taking control of a bus in said integrated circuit in said test mode, wherein a microprocessor coupled to said bus becomes a slave.

13. The method of claim 8 wherein said digital password is received by said test controller via one pin of said test interface while a clock signal is being received by said test controller via another pin of said test interface and said test interface is serial.

14. The method of claim 8 wherein said digital password comprises a predetermined sequence of a plurality of bits.

15. A method for entering test mode of an integrated circuit device comprising:
upon voltage application to said integrated circuit, entering a lockout period while voltage ramps up;
generating a power-on reset release signal at the end of said lockout period;
during a first time interval that begins at the falling edge of said power-on reset release signal and has a first predetermined length, a test controller of said integrated circuit causing a synchronization pulse to be output over a serial test interface to an external controller coupled to said integrated circuit by said serial test interface, said pulse indicating said integrated circuit is willing to negotiate entry into said test mode;
during a second time interval that begins at the end of said first time interval and has a second predetermined length, said test controller monitoring said serial test interface for a digital password; and
in response to a valid password being received within said second time interval, said test controller entering said test mode.

16. The method of claim 15, further comprising:
in response to said valid password being received, said test controller generating an acknowledge signal.

17. The method of claim 15 further comprising:
said test controller receiving commands via digital packets over said test interface.

18. The method of claim 15 wherein said password is received by said test controller via one pin of said test interface while a clock signal is being received by said test controller via another pin of said test interface.

19. The method of claim 15 wherein said digital password comprises a plurality of bits.

20. The method of claim 1 further comprising:
after entering said test mode, transferring instructions from said test interface into an instruction queue; and
causing a microprocessor to execute an instruction from said instruction queue, bypassing a memory containing instructions to be executed by said microprocessor when not in said test mode.

21. The method of claim 8 further comprising:
after entering said test mode, transferring instructions from said external controller into a first memory comprising an instruction queue; and
causing a microprocessor to execute an instruction from said instruction queue, said microprocessor bypassing a second memory containing instructions to be executed by said microprocessor when not in said test mode.

22. The method of claim 15 further comprising:
after entering said test mode, said test controller transferring instructions received from said external controller over said serial test interface into a first memory comprising an instruction queue; and
said test controller controlling a multiplexer that selects an instruction from said first memory to cause a microprocessor to execute an instruction from said instruction queue, said multiplexer unselecting a second memory containing instructions to be executed by said microprocessor when not in said test mode.

* * * * *